Feb. 23, 1943.   H. J. HART   2,311,829
HOUSING FOR ELECTRODES OF LUMINOUS TUBES
Filed Feb. 2, 1942
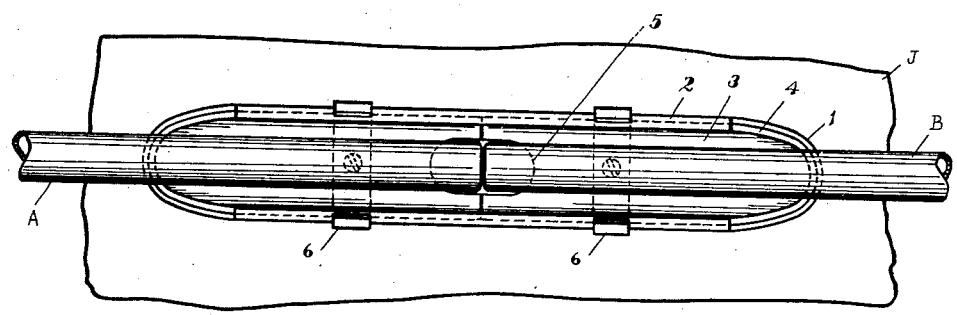
Fig. I.
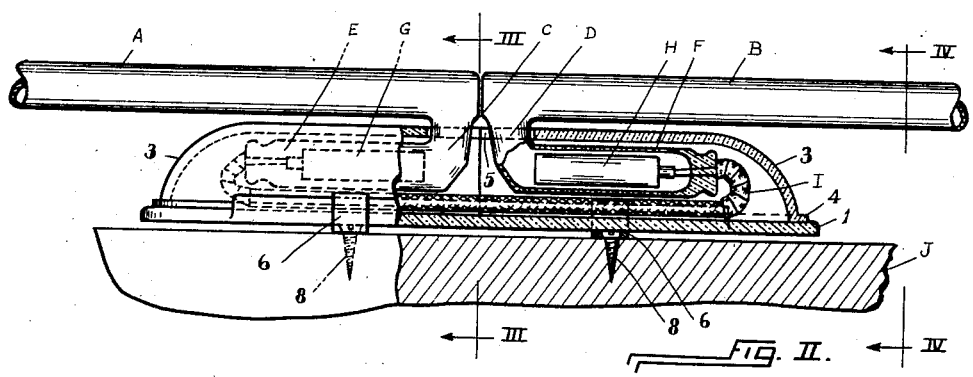
Fig. II.
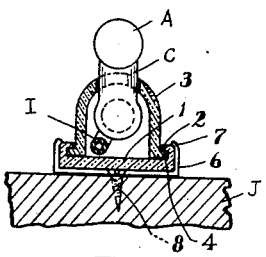
Fig. III.
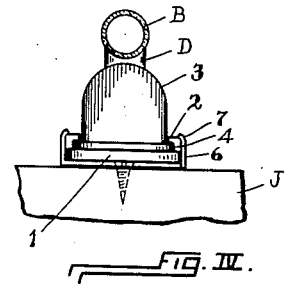
Fig. IV.
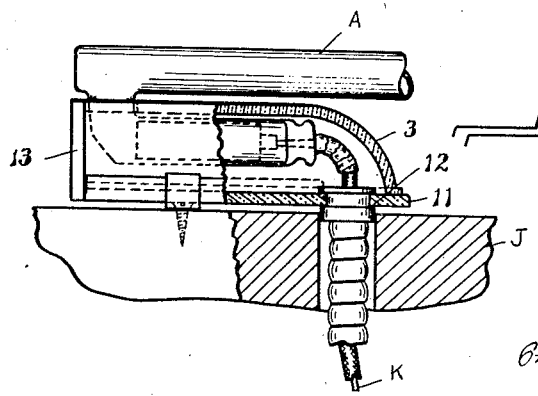
Fig. V.
INVENTOR
Harry J. Hart
BY
Christy, Parmelee and Strickland
ATTORNEYS Patented Feb. 23, 1943

2,311,829

UNITED STATES PATENT OFFICE 2,311,829

HOUSING FOR ELECTRODES OF LUMINOUS TUBES

Harry J. Hart, Baldwin Township, Allegheny County, Pa.

Application February 2, 1942, Serial No. 429,202

5 Claims. (Cl. 173—328)

This invention relates to luminescent-tube lighting, and consists in a fixture adapted to screen from sight, to isolate from disturbing electrical influence, and to protect from physical injury, the electrode-containing end of the installed tube; a fixture having features of adjustability that adapt it to service conditions; and a fixture that occupies minimum space, allowing the tube to be spaced closely adjacent to the supporting surface. The objects of invention are indicated in the foregoing sentence.

In the accompanying drawing Fig. I is a fragmentary view in plan of a luminescent-tube installation that includes the fixture of my invention; Fig. II is a view, partly in side elevation, partly in vertical and longitudinal section of the same assembly; Figs. III and IV are views in vertical and transverse section, on the planes indicated at III—III and IV—IV, Fig. II. Figs. I-IV show the fixture adapted for service at a point where in installation two lengths of tube are brought in end-to-end alignment, and the adjacent electrodes of the two tubes are brought into electrical continuity. Fig. V is a view in vertical and longitudinal section of the portion of an installation that includes a fixture adapted for service at one end of an installed tube or tube assembly. Comparison with Fig. II will make plain the details of the several adaptations.

Referring, first, to the fixture adapted for intermediate placement, and illustrated in Figs. I-IV, it consists of a base and a cover. The base is a plate 1, which may be understood to be formed of suitable dielectric material—of glass, for example, or of a thermoplastic derivative of synthetic resin. It is elongate and is adapted along its opposite parallel edges to make a union permissive of sliding with cover parts presently to be described. Specifically, as here shown, the base plate 1 is formed with parallel lateral flanges 2 that have opposite overhanging margins. The flanges form upon the plate a slideway for the cover. The length of the plate exceeds the overall length of the adjacent electrodes at the ends of two lengths of tubing brought together in an assembly. The cover (formed also of dielectric material) is in this case a two-part member, consisting of the duplicate parts 3, 3. These parts are of the general shape of half of an approximately cylindrical shell split on a diametrical plane. Specifically, these parts, open at one end, are closed at the other by a rounding or arching of the cylinder wall to the diametrical plane alluded to. These parts are of tunnel form; they are adapted to rest by their longitudinal edges upon the plate 1; and they are adapted to be united with plate 1 in a union permissive of a sliding movement of the cover parts upon the base plate. Specifically, as here shown, the cover parts are flanged externally along their longitudinal edges with flanges 4, and by such flanges they are adapted to be engaged by and between the flanges 2 upon the plate 1, and in such engagement they are severally longitudinally movable. These cover parts at their meeting and otherwise open ends are recessed with notches, by which they are adapted in the assembly to encircle the necks of the reversely turned ends of two lengths of tube, and yet to meet in end-to-end abutment. The notching, manifestly, might be done upon one of the two cover parts only, the companion part being unnotched. To serve in the same installation, the notch formed in one part only would have to be of twice the depth of the two notches formed in the two parts, as shown. The manifest disadvantage in so doing is that the cover parts would not then be duplicate and interchangeable parts; but pairs of unlike cover parts would have to be provided.

Figs. I and II show a conventional meeting of the ends of adjacent lengths, A and B, of a luminous-tube assembly. These ends are turned first inward to form necks C, D, and then reversely to parallelism with the tube bodies, in terminal heads E, F. Within these heads the electrodes G, H, are arranged; and the electrodes are connected electrically through conductors that penetrate the closed end walls of the heads of the tubes (being sealed in the substance of which the tubes are formed). The wall-penetrating conductors of two adjacently placed tube ends are in installation brought into electric continuity by means of a length I of insulated conductor. It may be understood that the assembly of parts A-I, inclusive, is a known assembly and that (by means not shown) it is mounted upon and carried by a wall J. It is a feature of my invention that it allows the interval at which the tube lengths A, B are spaced from the face of the wall J to be reduced to a minimum. The invention is wholly concerned with the encasing or housing of the reversely turned, electrode-containing ends E, F of the lengths A and B of luminescent tube.

The plate 1 is initially brought to position and secured to place on the face of the wall J; the assembly of the parts A-I then is made; after the completion of such assembly the cover parts 3 are applied from the opposite ends of the plate 1, and, engaged along their basal flanges 4 by the inturned flanges 2 of the base plate, they are slid oppositely until they meet, edge to edge, in the position shown in Figs. I and II. In this position, it will be perceived that the reversely bent electrode-containing ends of the tube lengths A, B, together with the electrical connection between the electrodes, are but for the port defined by the notches 5, completely encased. Since the cover parts 3 are freely movable longitudinally upon the base plate 1, the structure accommodates itself to small variation in the position of the meeting ends of the tube lengths.

The base plate 1 is secured to the face of wall J in suitable manner. Preferably, and as an additional feature of invention, I provide a mounting that permits of longitudinal adjustment of the plate 1 itself; and in so doing widen the margin of accommodation to variation in the position of the meeting of the tube lengths. I secure to the face of the wall J a slideway for the base plate 1. As here shown the slideway consists of an aligned succession of essentially U-shaped clips 6 with inturned ends 7, secured by screws 8 to the wall J. In such assembly, between the high-tension electrodes H and the metal screws 8 extends a continuous web of dielectric material afforded by the base plate 1; while the seams of meeting of the edges of base plate and cover parts are such in form and arrangement that the electrical isolation of the electrodes H is adequate and secure.

The modifications in structure that adapt the fixture to service at the end of a tube or tube assembly are shown in Fig. V. The base plate 11 is ported at 12, for the passage through of the conductor K, properly insulated, that carries the energizing luminosity-affording current; and the base plate at one end is provided with a perpendicular wall 13, which in the assembly forms an end closure of the housing. But one cover member is required, the member 3, identical with the members 3 of the housing of Figs. I–IV. When the base plate 11 has been secured to the wall J and the tube assembly completed, the cover 3 is applied as before, by sliding it to place, from right to left as seen in Fig. V. In a given installation, the position of the end of the tube or tube assembly, from which a conductor K leads away to a source of electric energy, is predetermined. No adjustment is requisite, and none is provided for. It remains to remark that, if adjustability of the cover 3 upon the base plate 11 were desired, it could readily be provided by modification of the wall 13 of Fig. V, and mounting it as the cover 3 is mounted in sliding engagement with the base plate 11.

Comparing the modification, as shown in Fig. V, with the principal form, as shown in Fig. II, it will be seen that the two structures are generically alike in this: both include a base plate and a cover member borne by the base and adapted to slide upon the base. The base plate is provided with an upstanding wall. In one case (Fig. II) the wall is movably borne by the base, and is indeed the oppositely placed and complementary cover member; in the other case (Fig. V) the wall is the immovable wall 13, integrally formed upon the base plate; but in both cases the cover member first named is movable to and from abutment upon the upstanding wall, and by such abutment it completes the electrically isolating housing around the tube end. In the ensuing claims I shall in the term "upstanding wall" include these alternative features of structure.

Manifestly the material of which the housing is composed, in addition to being dielectric, may be wholly or in part translucent or opaque, with the consequence and effect of concealing the reversely turned ends of the tube lengths; and it may be colored, to conform in color to the supporting surface. The housing occupies minimum space and allows the tube to be brought to minimum space from the supporting surface; and, by assimilation to the color of the supporting surface, may be rendered inconspicuous, and to casual glance invisible.

I claim as my invention:

1. In a lighting installation that includes a luminous tube with reversely turned electrode-containing end, mounted adjacent a supporting surface, the invention herein described, which consists of an electrically isolating housing for such tube end including a base plate of dielectric material imperforate from edge to edge and presenting an unbroken dielectric screen to the electrode of the assembled structure, means engaging the opposite edges of the base plate and securing the base plate to the supporting surface, and a cover of dielectric material of arched and tunnel form borne by said base plate and engaging the base plate in a flanged union permissive of sliding of the cover upon the base plate 2. In a lighting installation that includes a luminous tube with a reversely turned electrode-containing end, mounted adjacent a supporting surface, the invention herein described, which consists of a slideway adapted to be secured to the supporting surface, an electrically isolating housing for the tube and including a base plate of dielectric material imperforate from edge to edge, and presenting an unbroken dielectric screen to the electrode of the assembled structure, said base plate being mounted in the slideway, and a cover of dielectric material of arched and tunnel form borne by said base plate and engaging the base plate in a flanged union permissive of the sliding of the cover upon the base plate.

3. In a lighting installation that includes a luminous tube with a reversely turned electrode-containing end, mounted adjacent a supporting surface, the invention herein described, which consists of an electrically isolating housing structure that includes a slideway formed upon such supporting surface, a base plate of dielectric material imperforate from edge to edge and presenting an unbroken dielectric screen to the adjacent electrode of the assembly, said base plate being formed with opposite parallel edges adapted to be engaged at its edges by such slideway and by virtue of such engagement adjustable in its position in the slideway, the said base plate being provided with two parallel and spaced apart flanges, and a cover of dielectric material and of arched and tunnel form adapted to be engaged at the bases of the arch by the said flanges upon the base plate and by virtue of such engagement adjustable in its position on the base plate.

4. In a lighting installation that includes two lengths of luminous tube with reversely turned electrode-containing ends arranged in end-to-end alignment and mounted adjacent a supporting surface, the invention herein described which consists of an electrically isolating housing structure that includes a slideway mounted on such supporting surface, an imperforate base plate of dielectric material and presenting in the assembly an unbroken dielectric screen to the adjacent electrode, said base plate having opposite parallel edges adapted to be engaged along such edges by said slideway and by such engagement to be adjustably borne by the slideway, the said base plate being provided with two spaced-apart and parallel flanges, and a two-part cover of dielectric material and of arched and tunnel form adapted to be engaged at the bases of the arch by the flanges upon the base plate and by virtue of such engagement being adjustable in position upon the base plate, the said cover parts being closed each at one end and adapted at their other end to meet in end-to-end abutment, completing the housing, such housing being ported by notching at the meeting edges of the cover parts for the extension through of the necks of the reverse turns of the tube ends.

5. In a lighting installation that includes a luminous tube with a reversely turned electrode-containing end, mounted adjacent a supporting surface, the invention herein described, which consists of an electrically isolating housing for such tube end including a base plate of dielectric material imperforate from edge to edge, and presenting an unbroken dielectric screen to the electrode of the assembled structure, an upstanding wall of dielectric material borne by the base plate, means engaging the opposite edges of the base plate and securing the base plate to the supporting surface, and a cover of dielectric material of arched and tunnel form borne by said base plate and engaging the base plate in a flanged and sliding union, the said cover in the range of its sliding movement upon the base plate making abutment upon the upstanding wall borne thereby.

HARRY J. HART.